United States Patent [19]

Henoch

[11] Patent Number: 5,053,713
[45] Date of Patent: Oct. 1, 1991

[54] TRANSDUCER MONITORING ARRANGEMENT

[76] Inventor: Bengt Henoch, Backvindeln 90, S-126 57 Hägersten, Sweden

[21] Appl. No.: 438,489
[22] PCT Filed: Apr. 17, 1989
[86] PCT No.: PCT/SE89/00210
  § 371 Date: Dec. 19, 1989
  § 102(e) Date: Dec. 19, 1989
[87] PCT Pub. No.: WO89/10542
  PCT Pub. Date: Nov. 2, 1989

[30] Foreign Application Priority Data
  Apr. 22, 1988 [SE] Sweden .................. 8801512

[51] Int. Cl.$^5$ ............................. G01R 31/02
[52] U.S. Cl. ..................... 324/537; 324/601; 324/605; 324/612
[58] Field of Search ............ 324/537, 500, 555, 601, 324/605, 606, 602, 612, 71.1, 71.5, 202

[56] References Cited

U.S. PATENT DOCUMENTS

| | | | |
|---|---|---|---|
| 4,155,080 | 5/1979 | Kovacs | 324/500 X |
| 4,162,491 | 7/1979 | Gochis | 324/609 X |
| 4,267,505 | 5/1981 | Biglin | 324/537 |
| 4,307,335 | 12/1981 | Paulson | 324/537 |
| 4,806,847 | 2/1989 | Atherton et al. | 324/689 X |
| 4,831,362 | 5/1989 | Tsaprazis | 324/204 X |
| 4,837,508 | 6/1989 | Garnault | 324/546 X |

FOREIGN PATENT DOCUMENTS 57-190219 11/1982 Japan .
981909 12/1982 U.S.S.R. .

Primary Examiner—Kenneth A. Wieder
Assistant Examiner—Robert W. Mueller
Attorney, Agent, or Firm—Nies, Kurz, Bergert & Tamburro

[57] ABSTRACT

An arrangement for monitoring a transducer, or detector, which produces an analogue or digital output signal corresponding to a state sensed by the transducer. The invention is characterized in that the transducer includes activatable and deactivatable elements (RB 3, 23) which are intended to influence the transducer in a manner to cause the transducer to produce a signal which deviates from the actual state detected by the transducer, and in that there is provided a control circuit (10) which is intended to activate and/or deactivate the elements in a predetermined sequence, in response to the signal produced by the transducer. The arrangement also includes a control device for detecting the transducer output signal and comparing changes in the output signal in dependence on the activation and/or deactivation of the elements (RB 3, 23). The control device is constructed to detect whether or not the function of the transducer is correct, on the basis of this comparison.

13 Claims, 3 Drawing Sheets

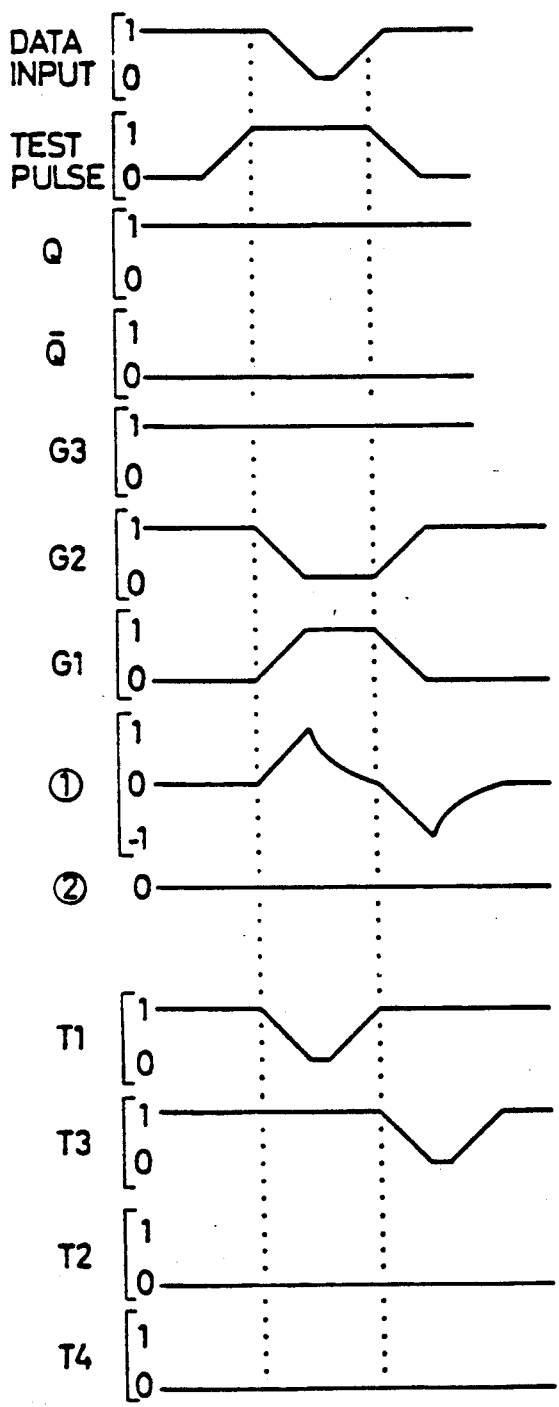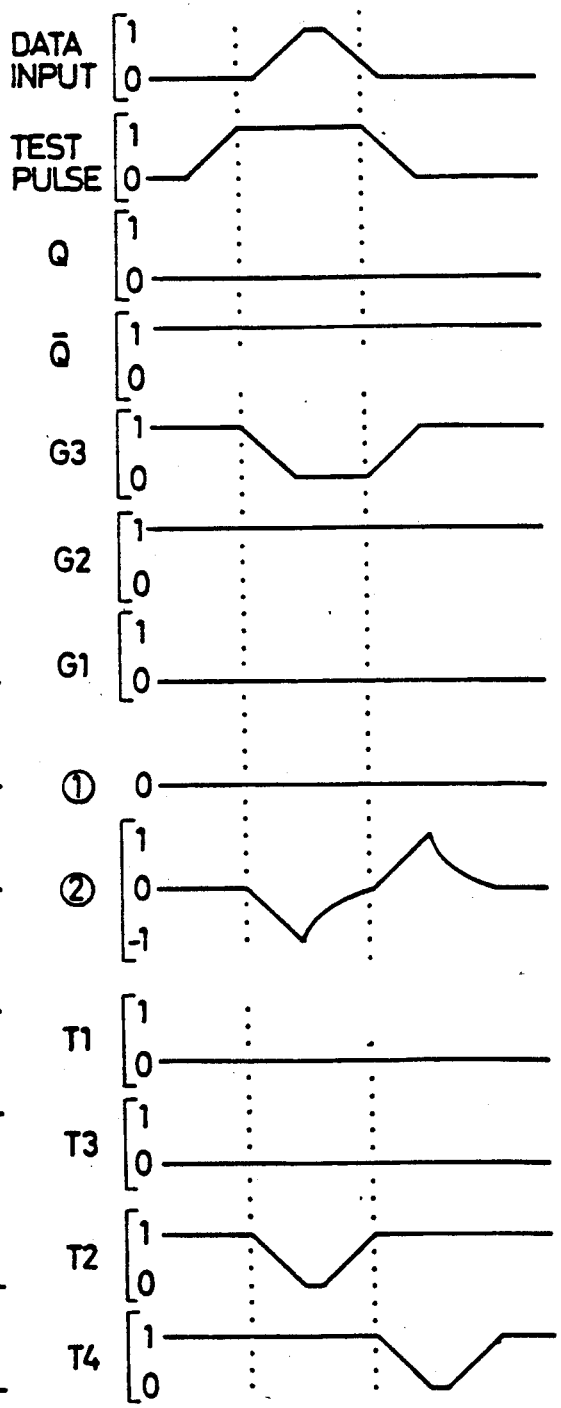

TRANSDUCER MONITORING ARRANGEMENT

The present invention relates to an arrangement for monitoring detectors or transducers of the kind used to indicate different states.

By detector, hereinafter referred to as transducer is meant a device which is constructed to respond to a given event or occurrence, or to a given state and to produce accordingly a predetermined electric signal, which may constitute a measuring value or a predetermined state variable.

Such transducers are used in different automatic systems, such as industrial process control systems, or in complicated machines, such as aircraft among others.

The use of transducers for collecting input data for process control purposes stands and falls on the reliability of the transducers used in the system. This is emphasized by the fact that in an automatic process, about 80% of the downtime periods and disturbances experienced in operation are caused by malfunctioning of the transducers used.

The nature of this problem is accentuated when an automatic process is monitored and controlled by a computer system.

The problem is solved by the present invention, which proposes that the function of such transducers is monitored.

Accordingly, the present invention relates to an arrangement for monitoring transducers which are intended to produce an analogue or digital output signal corresponding to a state sensed by the transducer or detector, and is characterised in that the transducer includes activatable and deactivatable elements which are intended to influence the transducer in a manner such that said transducer will produce a signal which deviates from the actual state sensed by the transducer; and in that the arrangement includes a control circuit which, in response to a given signal, is responsive in activating and/or deactivating said elements in a predetermined sequence; in that a control device is provided for detecting the output signal of the transducer and comparing changes in the output signal caused by activation and/or deactivation of said elements; and in that the control device is effective, through said comparison, in detecting whether or not the transducer function is correct.

Thus, the invention relates to an transducer of the kind which is intended to pass through a test mode in which the transducer or its detecting area in space is subjected to such changes that the event or the state which the transducer is intended to detect is simulated during the so-called test mode, i.e. when the transducer is tested, the transducer reporting the simulated event or state to a recieving device, such as a superordinal control system.

According to one embodiment of the invention, the test mode is initiated by the superordinal control system, such as a datorised control system. When the transducer is subjected to the test mode, it will send to the receiver signals which are compared with predetermined signals or values, these predetermined signals or values corresponding to those signals obtained from the transducer when its function is known to be correct. Thus, the transmission of the transducer signal from the transducer to the receiver is also tested, in addition to testing the transducer.

One method of using this type of transducer is for the function of the transducer to be tested systematically, prior to accepting a transducer signal, by calling and activating the test mode. In this way, prior knowledge can be obtained of those functional errors which are likely to occur, which provides basis for a systematic and ordered error correction.

Another method of using this type of transducer is afforded when systematic use of the test mode is combined with duplication of critical transducer functions. The probability that both of the transducers will produce an error signal simultaneously is low. The use of the test mode enables a faulty transducer to be replaced before both transducers produce a faulty transducer signal.

It is obvious that the inventive arrangement has a very wide field of use and that the arrangement is not restricted to a few, special fields in which transducers are used.

It will also be understood that the present arrangement can be applied with a very large number of different kinds of transducer.

The invention will now be described in more detail with reference to a number of mutually different, exemplifying embodiments in which the present arrangement is applied to different kinds of transducer.

It will be understood that the present invention is not limited to the types of transducer described below, and that the invention can be applied to other types of transducers, such as electric transducers for indicating electrical magnitudes, mechanical transducers in which, for instance, relays or other electromechanical devices activate the mechanical transducer during the test mode period, etc.

The aforesaid exemplifying embodiments are illustrated in the accompanying drawings, in which FIG. 1 is a block schematic of an arrangement according to the invention;

FIGS. 4 and 5 are different pulse diagrams in which the status of different inputs, outputs and points are plotted against time;

As before mentioned, the present invention is characterised, inter alia, in that the transducer includes activatable and deactivable elements which are intended to influence the transducer in a manner to cause the transducer to produce a signal which deviates from the actual state sensed or detected thereby. Thus, these elements are constructed in a manner adapted to the type of transducer intended, as exemplified in the embodiments described hereinafter.

Figure 1:
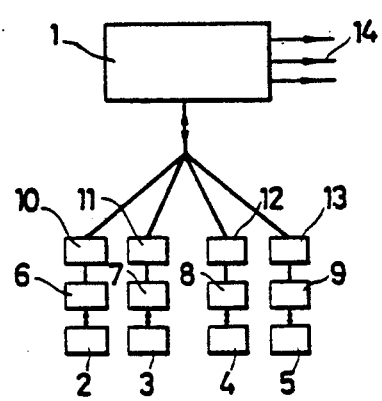

In the block schematic of FIG. 1, the reference numeral 1 identifies a control device, for instance a computer, which is connected by conductors to a number of transducers 2-5. Connected to the transducers 2-5 are respective activatable and deactivatable elements 6-9. A control circuit 10-13 is connected to each respective element 6-9.

The control device 1 is constructed to control or regulate mutually different components, apparatus or processes over lines 14, depending on the field of application, in response to signals sent from the transducers to the control device in respect of the various states detected.

According to the invention, respective control circuits 10-13 are constructed to activate and/or deactivate said elements 6-9 in a predetermined sequence, in response to a given signal.

The control device is also constructed to detect the output signals of respective transducers and to compare changes in the output signal occurring as a result of the activation and/or deactivation of said element 6-9. The control device is intended herewith to detect whether the function of the transducer is correct or not, through said comparison.

According to one preferred embodiment of the invention, the elements 6-9 are integrated with the electronics of the transducer and consist of activatable and deactivatable electrical elements.

Preferably, the aforesaid elements will be activated and deactivated by means of electronic switches, preferably transistors, in which case said control circuits 10-13 will be constructed to control said switches in the aforesaid predetermined sequence.

Various different transducer embodiments provided with an arrangement according to the present invention will now be described.

An inductive transducer may be used, for instance, to indicate the presence of a metal object or to indicate a distance to a metal object.

Figure 2:
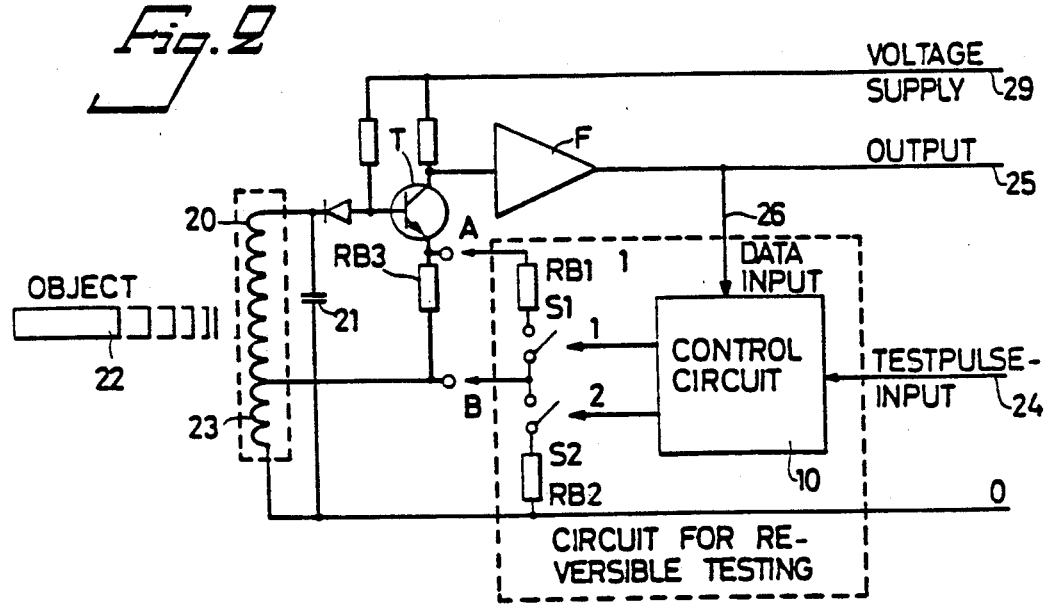
FIG. 2 illustrates an inductive transducer with associated circuits.

FIG. 2 illustrates one such transducer.

The function is based on an LC-oscillator which includes a coil 20 and a capacitor 21, the coil 20 being the coil which is activated or influenced by a metal object 22 located in the close proximity of the transducer. The LC-oscillator may operate, for instance, at a frequency of 500 kHz. When a metal object comes close to the coil 20, heavy current losses will occur in the metal, therewith decreasing the oscillating amplitude of the oscillator.

This reduction in amplitude is converted to a measurement value signal which is sent as an output signal from the transducer to the control device, in which the measurement value signal is evaluated as indicating the presence of the metal object or a distance to said metal object. The transducer is supplied with voltage through the conductor 29.

In this case, the aforesaid activatable and deactivatable elements have the form of losses which are brought into and out of the system.

FIG. 2 illustrates two switches S1 and S2. The conductors are connected at the points A and B to the points in front of the arrows at A and B. When the switch S1 is closed, inter alia the resistance RB 3 will be disconnected. When the switch S2 is closed, there is connected an inductance in the form of a further coil 23.

The aforementioned test mode is initiated by sending a test pulse signal to the input 24 of the control circuit 10.

When the transducer, or detector, is a digital transducer, by which is meant that the transducer will produce one or two signals indicating one or two states, the control circuit 10 is constructed to detect first which of the two states is indicated by the transducer and then to activate or deactivate said elements, so that the transducer will be caused to produce a signal corresponding to the opposite state. The function of first detecting the state indicated by the transducer is essential in the case of digital transducers.

In those cases when the test mode is initiated by activating elements which are operative in a direction towards the state in which the transducer is already found, an erroneous evaluation will be made of the signal sent by the transducer.

In the case of digital transducers, it is essential that the elements influence the transducer to an extent such as to overcome any hysteresis of the transducer. Furthermore, in the case of digital transducers, it is essential that the transducer will continue in the state indicated prior to commencing the test mode, upon completion of said mode. This last mentioned is particularly important in the case of transducers having hysteresis effect.

When the transducer illustrated in FIG. 2 is located in the presence of an object 22, the oscillator amplitude will fall as a result of eddy current losses. In this case, the control circuit 10 is constructed to close the switch S1 at the beginning of the test mode period, in a manner hereinafter described, wherewith the loss RB 3 is deactivated or removed and the oscillator amplitude increases to a value which corresponds to the absence of the object. Immediately after re-opening the switch S1, the switch S2 is closed so as to bring in, or activate, the coil 23, which causes a loss of such high value as to reduce the oscillator amplitude to a lower level than the level of oscillator amplitude obtained when indicating the object. The test mode is terminated by re-opening the switch S2, by the control circuit, thereby returning the transducer to its normal detection mode.

When the transducer indicates the absence of an object, the control circuit 10, at the beginning of the test mode period, will first close the switch S2, wherewith the oscillator amplitude returns to a level or value corresponding to the presence of an object. Immediately after the switch S2 is re-opened, the switch S1 is closed, therewith causing the oscillator amplitude to increase to a level higher than the level obtained in the absence of the object. The test mode period is terminated by opening of the switch S1 by the control circuit 10, the transducer therewith returning to its normal detection mode.

The aforedescribed test mode has a reversible sequence. In the first instance, first losses were removed or deactivated, whereafter losses were induced or activated. In the second instance, first losses were induced or activated, whereafter losses were removed or deactivated. This test mode permits hysteresis to be obtained between indication and non-indication of objects, which is essential in order to ensure that an unambiguous indication is given.

As before mentioned, the transducer illustrated in FIG. 2 is constructed to produce a digital output signal. The conductive status of the transistor T is caused to change by the presence or the absence of an object. The signal on the collector of the transistor T is amplified by means of the amplifier F and is produced in the form of an output signal on the output 25.

However, when the transducer is constructed to produce an analogue output signal, the control circuit 10 is arranged to first close the switch S1 and, after said switch has been re-opened, to close the switch S2, or vice versa. In this case, the control device 1 is constructed to compare the output signals thus obtained from the transducer with predetermined values illustrative of how the amplitude of the output signal present prior to the test mode was activated by the activation and deactivation of losses during the test mode.

In the case of digital transducers, the switches S1 and S2 can be opened and closed quickly, whereas in the case of analogue transducers the various sections of the test mode should be short time intervals of determined length.

As before mentioned, in the case of digital transducers the output signal of the transducer is first sensed by the control circuit 10 prior to commencing the test mode.

Figure 3:
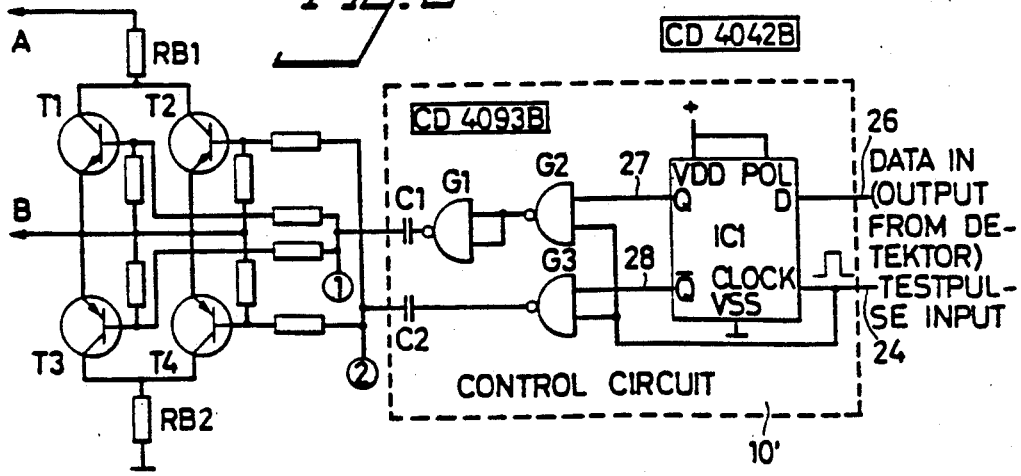
FIG. 3 is a more detailed view of the circuits illustrated in FIG. 2.

To this end, the control circuit 10 includes a directional logic circuit 10', the construction and function of which will be described briefly below, see FIG. 3. FIG. 3 shows the points A and B, the points A and B of FIG. 2. FIG. 3 is thus a more detailed view of part of the FIG. 2 illustration.

The switches S1 and S2 illustrated in FIG. 2 are preferably electronic switches, preferably transistor switches, constructed in accordance with the FIG. 3 illustration. Thus, the switch S1 includes the transistors T1 and T2. The switch S2 includes the transistors T3 and T4.

A conductor 26 extends from the output 25 in FIG. 2 to the directional logic circuit 10'.

The transducer produces on said output a high or a low signal, depending on whether an object is present or not.

This signal is applied to the input 26 of the logic circuit 10'. The logic circuit includes an integrated circuit IC1, which may, for instance, be an IC-circuit designated CD 4042B.

When no test pulse is present on the input 24 of the IC-circuit, the input is low. Provided that the input 24 is low, the outputs 27, 28 from the IC-circuit will follow the signal on the input 26, i.e. the transducer output signal.

The logic circuit 10' also includes three NAND-gates G1, G2 and G3, which may comprise an IC-circuit designated CD 4093B.

The inputs on the NAND-gates G1, G2 and G3 are connected to the outputs 27 and 28 and to the input 24 in the manner illustrated in FIG. 3. The outputs from the NAND-gates G2 and G3 remain static when no test pulse is found on the input 24.

The control device 1 sends a test pulse to the input 24 and to one of the inputs on G2 or G3. When the test pulse is received in the logic circuit 10', the outputs 27 and 28 are locked to the signal sent by the transducer and found on the input 26 upon receipt of the test pulse, and are held locked during the period at which the digital test pulse is high. Upon receipt of the test pulse, the output on G2 or G3 will be changed from a high level to a low level. The NAND-gate output which is changed to a low level will depend on whether it is the output 27 or the output 28 which is high.

Assume that the input 26 is high when the test pulse is received. In this case, the output 27 will be high during the duration of the test pulse, which means that the output on G2 is low during said duration of the pulse. The output from G3 remains static, since the output 28 will be low.

Subsequent to inversion in the NAND-gate G1, the output from G2 applies a positive pulse on a differential capacitor C1, which results in a positive voltage jump relative to the 0-level at the point 1 in FIG. 3. This voltage jump causes the transistor T1 to conduct over a somewhat shorter period than the length of the test pulse. At the end of the test pulse, there is obtained a negative voltage jump in relation to the 0-level at the point 1, which causes the transistor T3 to conduct over a length of time equal to the conductive period of T1.

The aforedescribed results first in closure of the switch S1 of FIG. 2 and subsequent opening of said switch, and thereafter closing and subsequent opening of the switch S2 in FIG. 2.

On the other hand, when the input 26 is low at the time of receiving the test pulse, the output 27 will be low, whereas the output 28 will be high. This means that the output on G3 will be changed from a high value to a low value when the test pulse is received. In this case, a negative pulse is obtained on the output G3, this pulse being applied to a differential capacitor C2, which results in a negative voltage jump relative to the 0-level at the point 2 in FIG. 3. This voltage jump causes the transistor T4 to conduct over a somewhat shorter time period than the length of the test pulse. At the end of the test pulse, there is obtained a positive voltage jump relative to the 0-level at the point 2, which was caused T2 to conduct conduct over a period of time equal in length to the time period for which transistor T4 was caused to conduct.

The aforedescribed results first in closure of the switch S2 in FIG. 2, and subsequent opening of the switch, followed by closing of the switch S1 in FIG. 2 and subsequent opening of said switch.

As will be evident from the aforegoing, the control circuit is constructed to first detect which of the two states is indicated by the transducer and then to activate or deactivate the aforesaid elements so as to cause the transducer to produce a signal which corresponds to the opposite state.

When the transducer used is an analogue transducer, no directional logic circuit 10' is used. Instead, a test pulse is applied directly to the differential capacitor C1. The transistors T2 and T4 with associated resistances, and the differential capacitor C2 are not included in this embodiment.

When a test pulse is applied to the differential capacitor C1, the transistor T1 is first caused to conduct over a period which is somewhat shorter than the length of the test pulse. At the end of the test pulse, the transistor T3 will conduct over a period which is equally as long as the transistor T1. Thus, this means that the switch S1 is first closed and then opened, and that the switch S2 is closed and then opened.

FIGS. 4 and 5 illustrate respectively a number of pulse diagrams in which the status of the inputs, outputs and points is shown as a function of time prior to, during, and subsequent to the duration of a test pulse having the appearance illustrated in FIGS. 4 and 5 respectively. In FIGS. 4 and 5, the reference "1" indicates that the signal is "high", and the reference "0" indicates that the signal is "low". With regard to the references in FIGS. 4 and 5, these correspond to the references shown in FIG. 3. Thus, Q denotes the output 27; Q denotes the output 28. DATA IN denotes the input 26.

The reference signs G3, G2 and G1 identify the outputs of respective NAND-gates.

The last four diagrams in FIGS. 4 and 5 illustrate when respective transistors T1, T2, T3 and T4 are conductive and non-conductive. The reference "1" indicates that the transistor is conductive and the reference "0" indicates that the transistor is non-conductive. Thus, it will be evident that when a test pulse is sent to the control circuit 10, losses will be activated and deactivated in the aforedescribed manner, irrespective of whether the transducer is a digital transducer or an analog transducer.

In the case of an inductive transducer, the aforesaid elements consist of impedences, preferably inductances and resistances.

The described control circuit may, of course, be used with other transducers than inductive transducers, the control circuit being used in the manner described for closing and opening two switches S1 and S2.

According to a preferred embodiment, such as that described above, the control circuit is integrated with the transducer, or detector.

However, it will be understood that the whole of the control circuit, or parts thereof, may be incorporated in the control device.

As before mentioned, the control device 1 is constructed to compare signals obtained from the transducer during the test mode with predetermined values and therewith detect whether or not the function of the transducer is correct. In one instance, the control device may comprise a computer which is programmed to carry out this comparison, in a known manner.

In another instance, that part of the control device which carries out said comparison may, instead, be integrated in the electronics of the transducer, i.e. connected to the control circuit. Particularly in the case of digital transducers, this part of the control device may comprise a gate network arranged, in a manner known per se, to compare the output signal from the transducer during the test mode with output signals from the gate network G1, G2, G3 of the control circuit.

Figure 6:
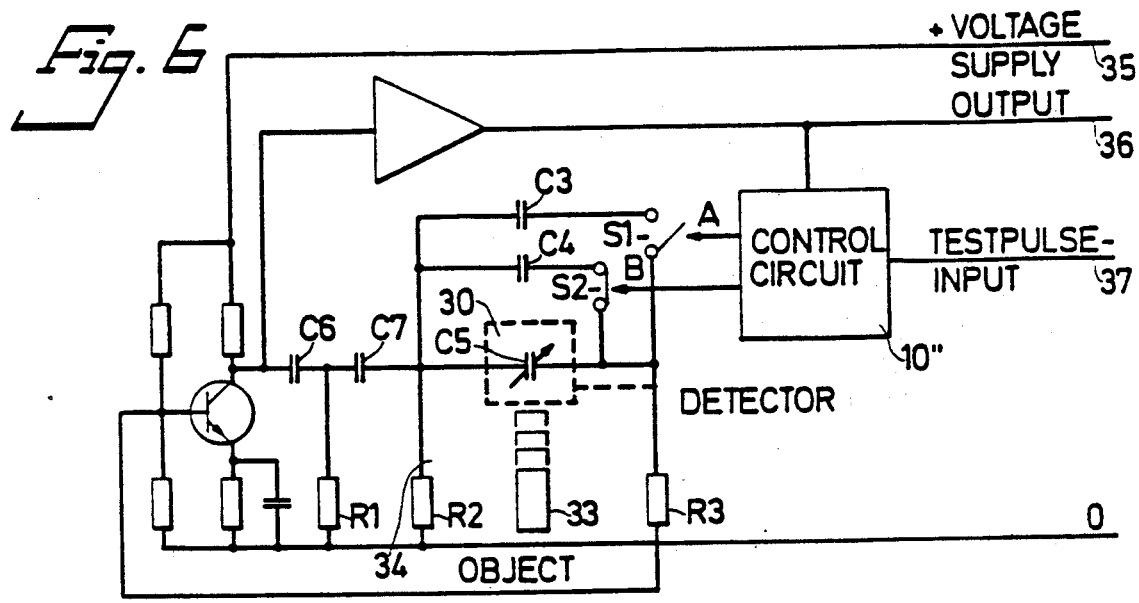
FIGS. 6 and 7 illustrate a capacitive transducer.

A capacitive transducer is illustrated in FIG. 6. A capacitive transducer can, inter alia, be used to indicate the presence or absence of an object which is not metallic.

Figure 7:
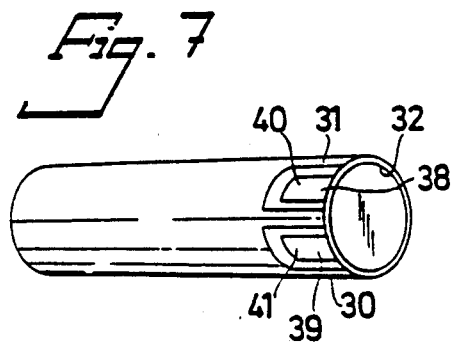

The measuring head of such a transducer 30 may have the configuration illustrated in FIG. 7, i.e. the configuration of a cylindrical capacitor constructed from capacitor electrodes 31, 32 whose capacitance is changed when an object 33 is sufficiently close to the measuring head 30.

FIG. 6 illustrates the transducer head located within a broken-line frame. A known capacitive transducer includes an RC-oscillator 34 of the phase shift type and constructed, as shown in FIG. 6, of capacitances C5–C7 including the measuring head C5 and resistances R1–R3. This RC-oscillator is dimensioned so as not to oscillate before said capacitance C5 exceeds a given value, i.e. before an object is in sufficiently close proximity.

A test mode for a capacitive transducer is designed so that capacitances can be activated and deactivated in a manner to simulate the presence or absence of an object.

FIG. 6 illustrates a control circuit 10'' designated "TEST LOGIC", which has a corresponding configuration to that described above with reference to FIGS. 2 and 3 in respect of a digital or analogue transducer. This control circuit 10'' includes two switches S1 and S2 for activating and deactivating capacitances C3 and C4. The supply lines of the transducer are referenced 35. The output of the transducer is referenced 36 and the control circuit input is referenced 37. The test mode functions in the following manner. When the transducer indicates the presence of an object, a test pulse on the input 37 will cause the capacitance C4 to be deactivated, by opening of the switch S2, therewith simulating the presence of an object. When the transducer indicates the absence of an object, the switch S1 is instead closed, wherewith a further capacitance C3 is activated so as to simulate the presence of an object.

When the transducer is a digital transducer, there is first detected the state indicated by the transducer, whereafter the oppostie state is simulated, as described above with referenced to the inductive transducer.

When the transducer is an analogue transducer, the control circuit 10'' is constructed in a manner corresponding to that described above with reference to an analogue inductive transducer, with which the test mode causes both states to be simulated over a respectively short time period.

The capacitances C3 and C4 may have the form of conventional capacitor components, although they may also comprise electrodes 38, 39 on the measuring head which are activated and deactivated via conductors, 40, 41, in the same manner as the capacitances C3 and C4 are activated and deactivated.

Mechanical transducers, such as limit switches, having one or more electro-mechanical components can be tested in the aforedescribed manner. In this case, a control circuit of the aforedescribed kind and electromagnetic devices may be arranged to activate mechanically the mechanical transducer.

A brief description will now be given of some other types of transducer of detector with which the present invention may be applied. This description simply aims to exemplify the wide field of use of the inventive principle with respect to transducer types, since it is not possible to describe all types of transducers here, because of the enormous variety of such transducers.

One type of transducer is based on the principle that the magnitude to be measured will influence the impedence of an electric circuit element, generally a resistance. Examples of such transducers include strain gauges, pressure gauges based on a piezo-resistive semiconductor material whose resistance will change with pressure, flow transducers in which the resistance of a heated wire will change as a result of heat transfer proportional to the flow passing through the wire, and temperature transducers which utilize a temperature responsive resistance, etc.

Figure 8:
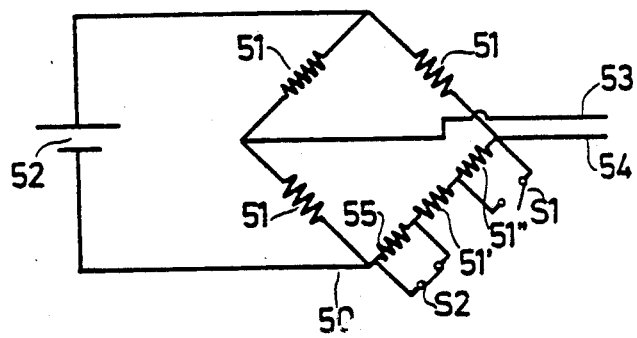
FIG. 8 illustrates an transducer of the kind utilizing a Wheatstone bridge.

FIG. 8 illustrates a type of transducer 50 which has the form of a Wheatstone bridge, in which four mutually identical impedance elements 5, 51', 51'' are supplied with voltage diagonally by means of a voltage source 52, wherewith in a deviation from balance is detected as a current the conductors 53, 54 across the other diagonal. In this case, one of the impedances 51', 51'' forms the aforedescribed transducer element. A control circuit 10 of the aforesaid kind is constructed to control two switches S1 and S2. By way of example, there is described a temperature transducer in which the impedance 51' is a temperature responsive resistance. When the switch S1 is closed, the impedance 51'' is deactivated, which simulates, for instance, an increase in temperature. When the switch S2 is opened, the impedance 55 is activated, which corresponds, for instance, to a decrease in temperature. This type of transducer or detector can be made digital or analogue, the description made with reference to the inductive transducer applying in this case.

Figure 9:
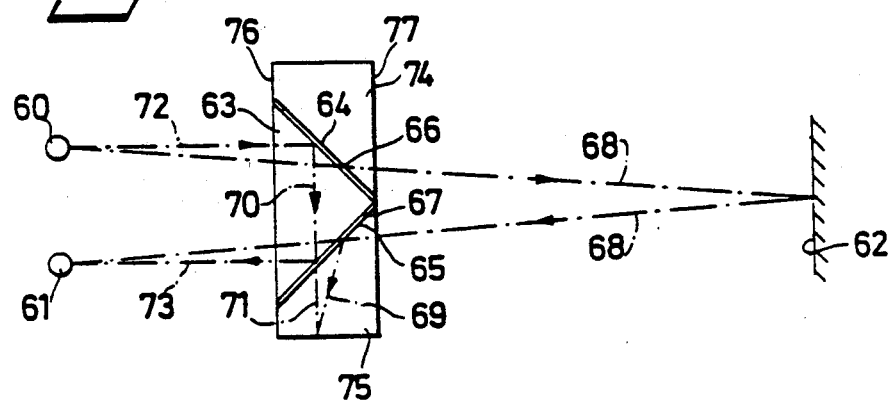
FIG. 9 is an optical transducer.

Another type of transducer is an optical, photo-cell transducer. One such transducer is illustrated in FIG. 9 and includes a light emitting device 60, such as a photodiode, a light sensitive device 61, such as a photo transistor, and a reflector 62. According to one embodiment, said element includes means for interrupting a light beam passing between the light emitting device to the light sensitive device, via a reflector, and means for establishing an alternative beam path between the light emitting and the light sensitive device.

Said means includes a prism 63 where one or two sides thereof, in the illustrative embodiment two sides 64, 65, are provided with a layer 66, 67 of voltage controlled liquid crystals, a so-called LCD-layer. The LCD-layer will cause the refractive index to change on relevant sides of the prism when a voltage is applied to the LCD-layer.

The prism 63 is surrounded by material pieces 74, 75, preferably of mutually the same material. The prism 63 and the pieces of material 74, 75, together form a body having two mutually parallel sides 76, 77 which lie in a plane at right angles to the beam path between the devices 60, 61 and the reflector 62.

The refractive index in an LCD-layer is influenced when a voltage is applied to the layer. The material from which the prism, the said pieces and the LCD-layer are formed is selected so that when no voltage is applied to the LCD-layer, light will be transmitted in accordance with the beam path 72, 68, 73.

Furthermore, the LCD-layer is selected so that its refractive index will decrease to a sufficient extent to give total reflection on the side surface 64 and 65 respectively when respective LCD-layers have a voltage applied thereto.

For instance, a prism and associated LCD-layer may be constructed so that when none of the LCD-layers has a voltage applied thereto, the beam path 68 shown in broken lines will prevail between the light emitting device 60, the reflector 62 and the light sensitive device 61. The arrangement includes two switches S1 and S2, which are controlled by a control circuit of the aforedescribed kind. When solely the switch S2 is closed, a voltage is applied to the LCD-layer 67, wherewith the beam 68 from the reflector 62 and incident on the prism 63 will no longer be transmitted through the prism, but will instead be reflected onto the side surface 65 as illustrated by the beam 69.

When solely the switch S1 is closed, a voltage will be applied to the LCD-layer 66, wherewith the light transmitted from the light emitting device 60 will not be transmitted through the prism, but will be reflected onto the side surface 64 and transmitted through the side surface 65, as illustrated by the beams 70, 71.

When both of the switches S1 and S2 are closed, the light 72 emitted by the light emitter device 60 will be reflected against the sides of 64 and against the side surface 65 onto the light sensitive device 61, as illustrated by the light beams 70, 73.

Instead of using a prism provided with LCD-layers in the aforesaid described manner, there may be used instead conventional, downwardly and upwardly pivotal mirrors which are operated by means of electromagnetic devices controlled via a control circuit of the described kind, in a corresponding manner to the control of the switches S1 and S2.

In the case of the FIG. 9 embodiment, the switches S1 and S2 are connected to a control circuit 10 of the aforedescribed kind, this circuit including a directional logic circuit of the described kind operative in first detecting whether or not the photo-cell arrangement indicates an object in its beam path 68 and then simulating the opposite state.

When the transducer, or detector, occupies the state in which no object is present in the beam path 68, the switch S2 is closed so that the light 68 will never reach the light sensitive device 61.

When the transducer, or detector, occupies the state in which an object is present in the beam path 68, both switches S1 and S2 are closed, wherewith the light beam will extend from the light emitting device 60 to the light sensitive device 61, via the inner beam path 72, 70, 73.

The prism 63 and the devices 60, 61 are preferably incapsulated. This affords the additional advantage of enabling the control device 1 to be constructed to compare the outward signal from the light sensitive device 61 when the beam path 68 is used and when the inner beam path 72, 70, 73 is used. The difference in amplitude between these signals is, inter alia, a measurement of the extent of dirt on the different optical elements in the beam path 68.

It will be evident that the light sensitive device 61 may, instead, replace the reflector 62 and be placed in its position so as to generate a direct beam path between the light emitting and the light sensitive device. In this case, there can be used a prism which has only one side thereof coated with an LCD-layer. However, in this case, no inner beam path is obtained.

Different types of transducer and different types of control circuits have been described in the aforegoing. It will be obvious to one skilled in this art, however, that the present invention can be applied with any type of transducer or devices in its measuring range capable of being activated electrically in a manner to influence the transducer such as to assume or to indicate a state which deviates from the state indicated in the absence of such influence, for the purpose of monitoring the function of the transducer.

It will also be evident that the structural design of the control circuits can be varied essentially, while retaining the aforedescribed function with respect to two or more switches S1, S2.

It will also be evident that modifications and variations can be made.

The invention is thus not restricted to the aforedescribed exemplifying embodiments, since such embodiments can be varied and modified within the scope of the following claims.

I claim:

1. An arrangement for monitoring a transducer which produces an output signal that is a signal type selected from signals including analogue and digital output signals corresponding to and representative of a state detected by the transducer wherein means in the transducer includes activatable and deactivatable elements (RB 3, 23; C3, C4; 66, 67) operative to cause said transducer to produce a signal which deviates from the signal representing the actual state sensed by the transducer, regardless of which state is actual sensed; and wherein the arrangement includes a control circuit (10, 10', 10") which is operative in activating and/or deactivating said elements in a predetermined sequence in response to a given test pulse control signal; a control device (1) is included for providing said test pulse signal, for sensing the output signal of the transducer and for comparing changes in the output signal in dependence on the activation and/or deactivation of said elements (RB 3, 23; C3, C4; 66, 67); and also wherein said control device (1) has means which will detect whether the function of the transducer is correct or not on the basis of said comparison.

2. An arrangement according to claim 1, wherein said elements (RB 3, 23; C3, C4) are integrated in said electronics of the transducer and comprise activatable and deactivatable electrical elements.

3. An arrangement according to claim 2, wherein electronic switches are provided in said transducer; said elements (RB 3, 23; C3, C4; 66, 67) are arranged to be activated and deactivated by means of said electronic switches; and in that said control circuit (10, 10', 10'') is intended to control said switches in said predetermined sequence.

4. An arrangement as defined in claim 3, wherein said electronic switches are transistors.

5. An arrangement according to claim 1, wherein said elements (66, 67) are separate from the electronics of the transducer and consist of elements which can be activated into or deactivated from the detecting range of the transducer in space.

6. An arrangement according to claim 1, wherein said control circuit (10, 10', 10'') is integrated in the transducer.

7. An arrangement according to claim 6, wherein said means in the control device (1), which is intended to carry out said comparison and arranged to send a signal to the remaining part of the control device (1) indicative of the fact of whether or not the function of the transducer is correct, is integrated in said transducer.

8. An arrangement according to claim 1, in which the transducer is a digital transducer which produces either one of two signals indicating one of two states, wherein said control circuit (10, 10', 10'') is constructed to first detect which of said two states is indicated by the transducer and then to activate or deactivate said elements (RB 3, 23; C3, C4, 66, 67) in a manner such as to cause the transducer to produce a signal corresponding to the other of said two states.

9. An arrangement according to claim 8, wherein the control circuit (10, 10', 10'') is constructed to re-set the transducer after said comparison, so as to cause the transducer to indicate the state which it indicated prior to activation or deactivation of said elements by said control circuit.

10. An arrangement according to claim 1, wherein the transducer is an inductive transducer, and wherein said elements consist of impedances which are inductances (23) and resistances (RB 3) which are activated and/or deactivated in or from the signal generating circuit of the transducer.

11. An arrangement according to claim 1, wherein the transducer used is a capacitive transducer, and wherein said elements comprise impedances, which are capacitances (C3, C4) which are activated and/or deactivated in or from the signal generating circuit of the transducer.

12. An arrangement according to claim 1, wherein the transducer used is an optical transducer and a light emitting device, a reflector and a light-sensitive device are associated with said optical transducer, and wherein said elements include means (63, 66, 67) for interrupting a beam path extending between said light emitting device (60) and said light-sensitive device (61) via said reflector (62), said arrangement further comprising interrupting means (63, 66, 67) for establishing an alternative beam path from said light emitting device (60) to said light sensitive device (61).

13. An arrangement according to claim 12, wherein said interrupting means includes a prism (63) having at least one of two sides thereof coated with an LCD-film (66, 67) which is operative in changing the refractive index on the side in question, thereby changing the beam path.

* * * * *